Figure 1:
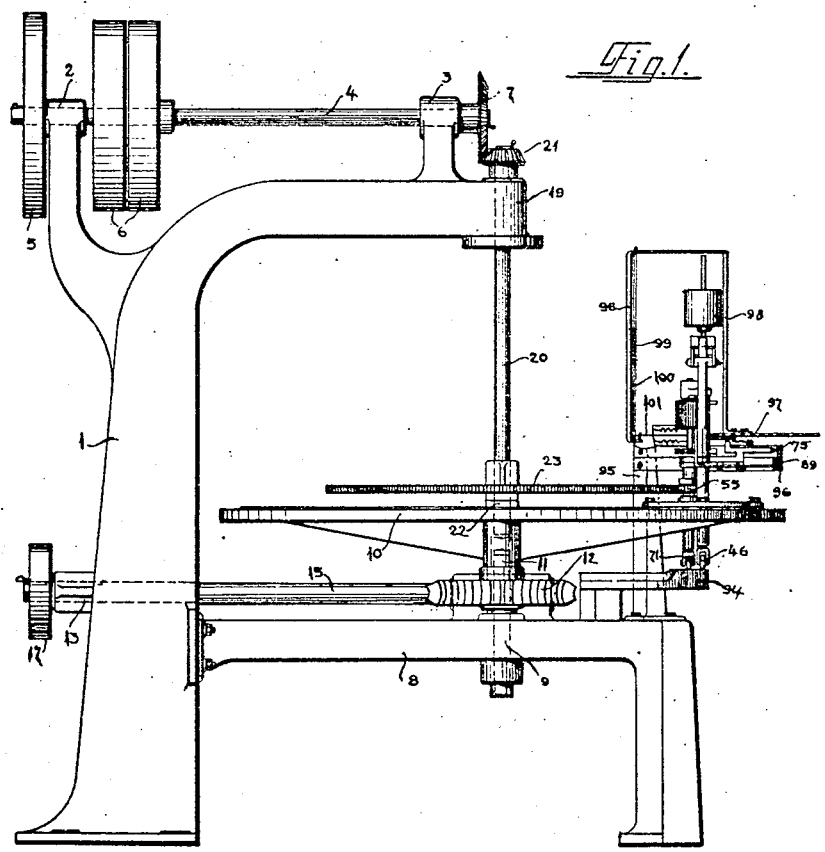

A. PAUL.
NUT SHELLING MACHINE.
APPLICATION FILED DEC. 15, 1911.

1,073,165.

Patented Sept. 16, 1913.
4 SHEETS—SHEET 1.

Witnesses:

Inventor:

A. PAUL.
NUT SHELLING MACHINE.
APPLICATION FILED DEC. 15, 1911.
1,073,165.
Patented Sept. 16, 1913.
4 SHEETS—SHEET 2.
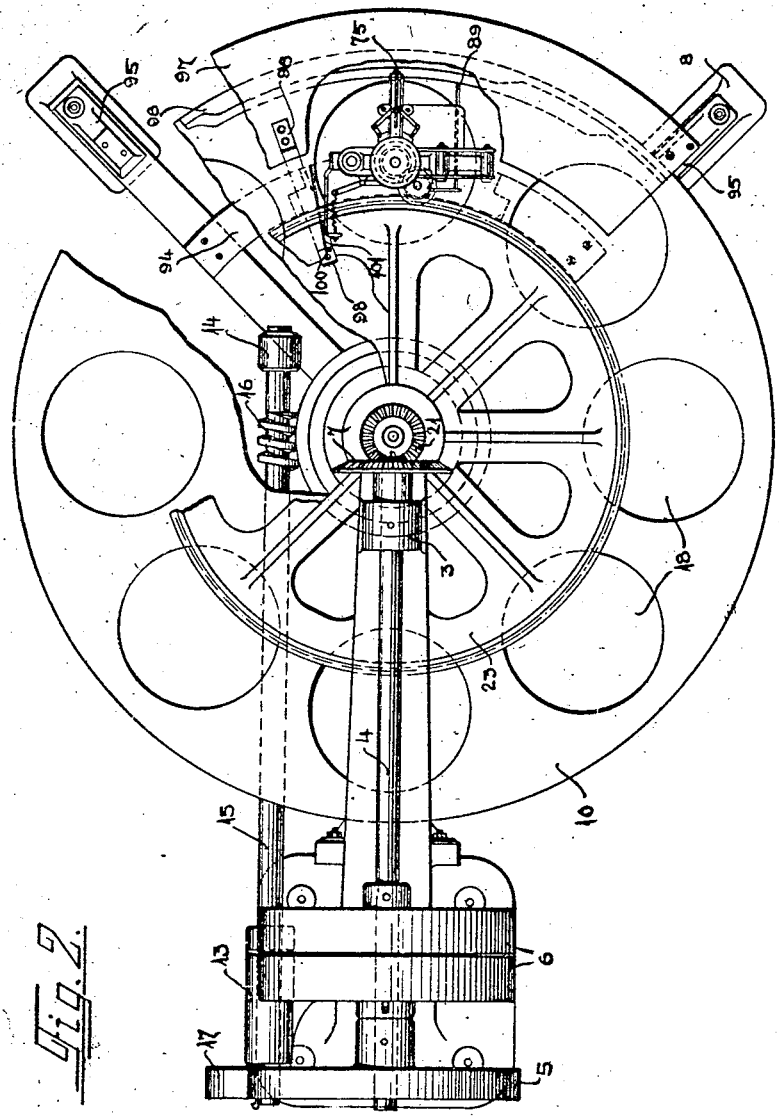
Witnesses:
Inventor:

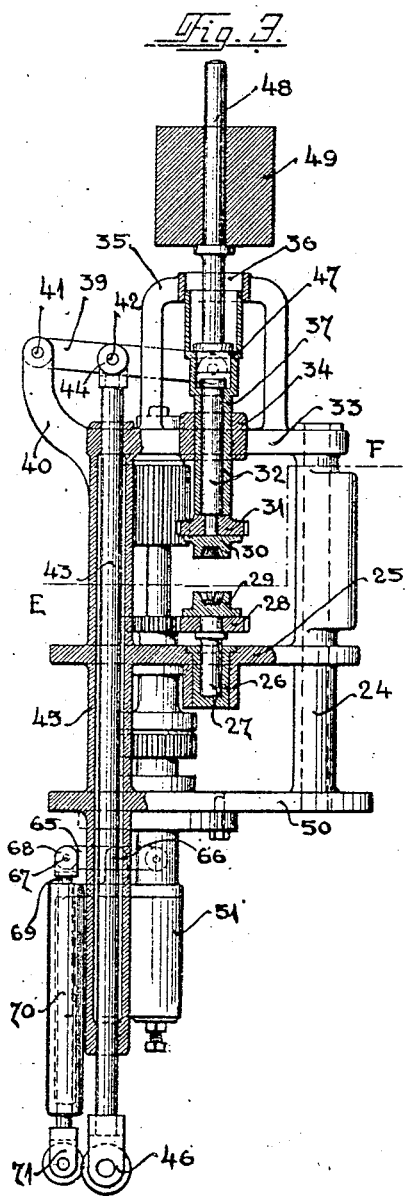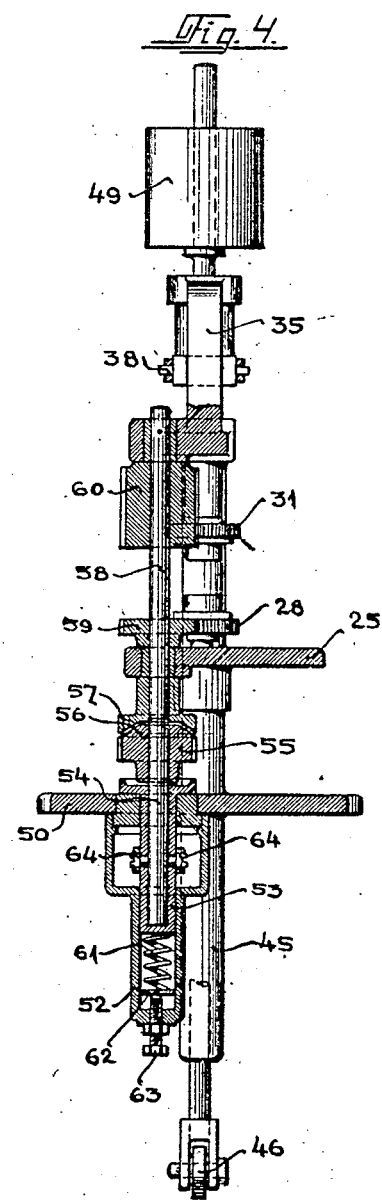

A. PAUL.
NUT SHELLING MACHINE.
APPLICATION FILED DEC. 15, 1911.
1,073,165.
Patented Sept. 16, 1913.
4 SHEETS—SHEET 4.
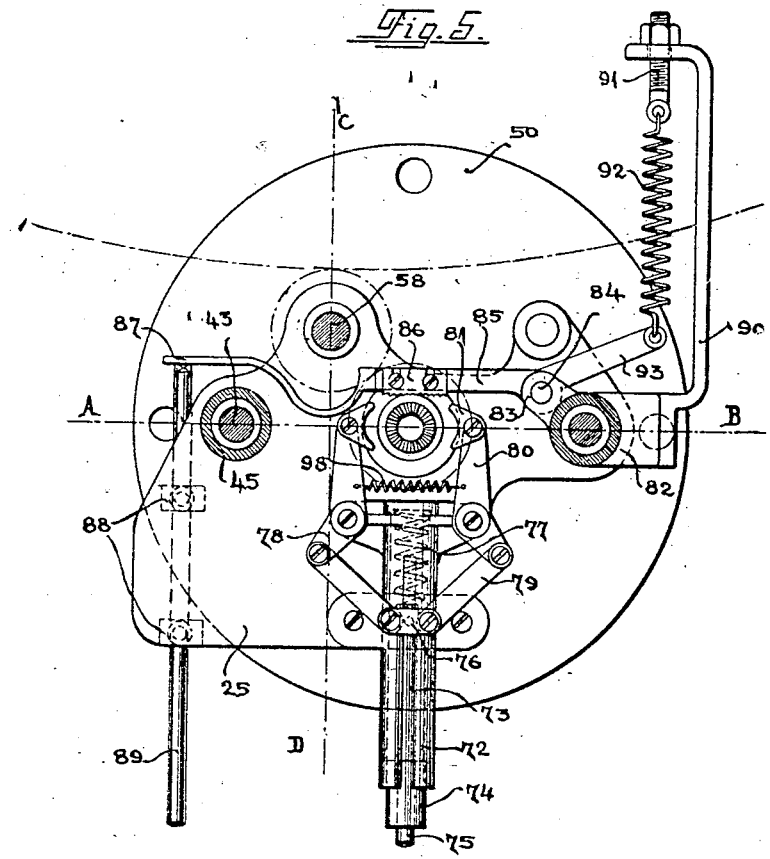
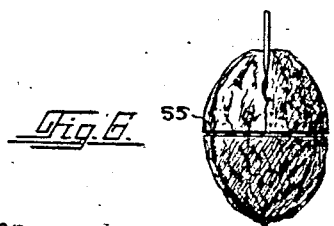
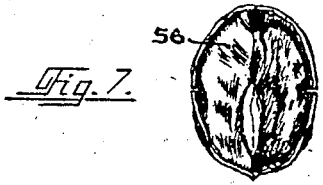
Witnesses
Inventor

UNITED STATES PATENT OFFICE.

ANTON PAUL, OF BUDAPEST, AUSTRIA-HUNGARY, ASSIGNOR OF ONE-HALF TO ADOLF BECK, OF BUDAPEST, AUSTRIA-HUNGARY.

NUT-SHELLING MACHINE.

1,073,165.      Specification of Letters Patent.      Patented Sept. 16, 1913.

Application filed December 15, 1911. Serial No. 666,032.

*To all whom it may concern:*

Be it known that I, ANTON PAUL, a subject of the King of Hungary, Emperor of Austria, residing at Budapest, in the Kingdom of Hungary, Austrian Empire, have invented certain new and useful Improvements in Nut-Shelling Machines, of which the following is a specification.

This invention relates to a nut shelling machine and more particularly to a machine for sawing the shell at the middle so as to make it ready to be split in longitudinal direction for removing the kernel, the splitting being effected by a separate machine.

In the accompanying drawings the nut sawing machine is shown by way of example:—Figure 1 is a side elevation of the machine. Fig. 2 is a plan view of the working table on a larger scale. Fig. 3 shows the sawing device proper partly in elevation and partly in section on line A—B of Fig. 5. Fig. 4 is a side elevation partly in section on line C—D of Fig. 5. Fig. 5 is a section on line E—F of Fig. 3. Fig. 6 shows the nut after the sawing. Fig. 7 shows the nut sawed and split.

The sawing device consists of the frame 1 with the vertical bearings 2 and 3 in which a shaft 4 is revolubly mounted. Upon this shaft the belt pulleys 5 and 6 are keyed. The shaft 4 carries at its front end a cogwheel 7. At the lower end of the frame 1 a horizontal support 8 is fixed which has a step bearing 9 for a spindle 11 which carries the table 10. A worm-wheel 12 is keyed upon the spindle 11 and meshes with a worm shaft 15 mounted in bearings 13, 14 of the frame 1. The worm shaft 15 is driven from the belt pulley 5 by means of the belt pulley 17.

The working table 10 has holes 18 near its periphery which pass under the sawing device when the working table 10 revolves.

In a horizontal arm 19 of the frame 1 the upper end of a vertical shaft 20 is mounted which carries at its upper end a pinion 21 meshing with the cog-wheel 7. The lower end of the vertical shaft 20 is mounted in the step bearing 22 of the working table 10. A toothed wheel 23 is keyed upon the vertical shaft 20 at some distance above the working table 10.

The nut sawing device proper (Figs. 3 and 4) essentially consists of a supporting frame 24 in the middle partition 25 of which the step bearing 26 for the vertical shaft 27 is arranged. A toothed wheel 28 is keyed upon the upper end of said vertical shaft 27 and carries the lower jaw of the nut holder. The upper jaw 30 of the nut holder is fixed upon a toothed wheel 31 keyed upon a shaft 32 which is mounted in a bearing 34 carried by the upper partition 33 of the supporting frame 24, and further in a cylindrical casing 37 which is mounted in the bearing 36 of the forkshaped extension 35 of the said partition 33. The casing 37 which is mounted in the bearings 34 and 36 so that it can displace itself in axial direction, has coupling pins 38 engaging with a forkshaped end of a lever 39. The outer end of this lever 39 is pivotally mounted upon an axle 41 carried by the bracket 40 projecting from the supporting frame 24. An arm 42 laterally projects from the middle of the lever 39, and the forkshaped end 44 of a vertical spindle 43 is mounted upon said arm. This spindle 43 is located in a cylindrical boring 45 of the supporting frame 24 and carries at its lower end a roller 46.

A rod 48 rests upon the flange 47 of the cylindrical casing 37 and carries an adjustable weight 49.

To the lower surface of the lower partition 50 of the supporting frame 24 a cylindrical casing 51 is fixed in which a vertical spindle 54 is mounted which has a toothed wheel 55 keyed upon its upper end. This spindle 54 is mounted in a step bearing 53, the upper end of which is flanged and bears upon the upper surface of the horizontal partition 50, its lower end penetrating into the part 52 of the cylindrical casing 51. The upper end 56 of the toothed wheel 55 which meshes with the toothed wheel 23 of the shaft 20 of the working table 10, is conical and serves as a friction cone. Above this friction cone 56 a conical clutch 57 is arranged at the end of a vertical spindle 58 mounted in bearings of the horizontal partitions 25 and 33.

Upon the spindle 58 there are keyed a toothed wheel 59 and a toothed cylinder 60 which mesh with the toothed wheels 28 and 31 respectively.

The step bearing 53 rests upon a spiral spring 61 the tension of which can be regulated by means of a regulating screw 63 acting upon a disk 62.

The step bearing 53 is made of two parts connected by means of screw bolts 64; these bolts serve as pivots for a two-armed lever 65 which further is adapted to pivot around an axle 67 which carries a fork-shaped end 68 of a rod 69 which is guided in a cylindrical extension 70 of the cylinder 51. At the lower end of the rod 69, which projects from said cylindrical extension 70, a roller 71 is mounted.

A cylinder 72 mounted upon the partition 25 (Fig. 5) has a longitudinal slot 73 in which the sliding piece 76 is guided which is mounted upon the rods 74 and 75; a spiral spring 77 inclosed in the inner end of the cylinder 72 bears with its outer end against said sliding piece 76. Upon the outer end of the sliding piece 76 the ends of two levers 79 are hinged, the other ends of which are hingedly connected with levers 78 which are further articulated to arms 80 which penetrate between the clamping jaws 29 and 30 for the nut, and carry jaws 81 which have arc-shaped faces. The cylinder 82 which surrounds the supporting arm 24 has a lateral arm 83 carrying an axle 84 upon which an arm 85 is pivotally mounted, this arm carrying the saw blade 86 at the part which registers with the clamping jaws 29 and 30. The end 87 of the arm 85 bears upon a rod 89 guided in brackets 88 of the partition 25. To the cylinder 82 a supporting plate 90 is fixed which supports a screw bolt 91 to the end of which a spiral spring 92 is attached, the other end of which is fixed to an arm 93 of the supporting arm 85 for the saw blade.

Upon the part 8 of the frame of the machine a segment 94 is mounted upon which bear the rollers 46 and 71. Upon this part 8 of the frame there is further mounted a bracket 95 which carries the segment 96 and the working table 97. Upon this segment 96 there bear the rods 75 operating the articulated lever system, and the rod 89 against the other end of which bears the end 87 of the arm 85 which carries the saw blade.

The removal of the kernel from the nutshell is effected in the following manner: The revolving motion of the shaft 4, which is driven from a motor, or in any other suitable manner, by means of the belt pulleys 6 and a convenient transmission, is transmitted by the cog-wheels 7 and 21 to the vertical shaft 20 whereby the toothed wheel 23 is revolved. The worm 16 of the shaft 15 is simultaneously revolved from the said driving shaft 4 by means of the belt pulleys 5 and 17 so that, through the intermediary of the worm-wheel 12, the spindle 11 which supports the working table 10 is revolved in opposite direction as the said toothed wheel 23 and at a lower speed. With the working table 10 revolve the sawing devices of which only one is illustrated in the drawing. The toothed wheel 55 of the sawing device, which meshes with the toothed wheel 23, is revolved with a speed equal to the difference between the speed of said toothed wheel 23 and the working table 10. The toothed wheel 55 of the sawing device takes along the spindle 58 through the intermediary of the friction cone 56 which by means of the spring 61 is pushed into the conical clutch 57 of said spindle. This spindle 58 and the toothed wheels 59 and 60 keyed upon the same transmit the revolving motion to the toothed wheels 28 and 31 which, in their turn, move the oppositely arranged clamping jaws 29 and 30 for the nuts.

Suppose that the nut is clamped in between said jaws in the direction of its longitudinal axis; in this case the upper clamping jaw 30 with the weight 49 will press upon the nut so that the same turns around a longitudinal axis together with the clamping jaw, and the saw blade 86 pressed against the nut through the action of the spring 92, will saw the shell owing to the revolving motion of the working table 10. In the meantime the nut sawing device proper will arrive at the cam 94, and the roller 71 rolling over this cam lifts its spindle 67 whereby the two-armed lever 65 makes the step bearing 53 descend against the action of the spring 61. With the step bearing 53 the shaft 54 descends, whereby the friction between the shafts 54 and 58 is interrupted so that the shaft 58 and with the same the clamping jaws 29 and 30 are stopped. Simultaneously the rod 89 bearing upon the arm 85 which supports the saw blade has arrived upon the cam of the segment 96 whereby the supporting arm 85 and with it the saw blade 86 are moved away from the nut against the action of the spring 92. Immediately after this, the roller 46 arrives at the cam 94 whereby the rod 43 is lifted and draws along the cylindrical sleeve 37 with a weight 49, through the intermediary of the levers 39; simultaneously the upper clamping jaw 30 for the nut is lifted so that the nut can be removed either by hand or by air under pressure. Another nut has been placed in the meantime upon the clamping jaw 29 so that as the end of the rod 75 arrives at the cam of the segment 96 the jaws 81 at the ends of the articulated levers are closed through the action of the spring 98 and grip the nut. These jaws 81 hold the nut until the roller 46 has gone away from the cam 94 so that the upper clamping jaw 30 is lowered upon the nut. The end of the rod 75 goes away from the cam of the segment 96 whereby the jaws 81 are opened. The roller 71 going away from the cam, the rod 67 is lowered and lifts by means of the lever 65 the spindle 54 with a friction cone 55 so that the spindles 54 and 58 are coupled, simultaneously the clamping jaws 29 and 30 begin to revolve owing to the revolving motion of the toothed wheels 28 and 31 so that the nut begins to turn. At the same time the rod 89 has gone away from the lower cam of the segment 96 so that the saw blade 86 is pressed, through the action of the spring 92, upon the revolving nut so that the shell is sawed as hereinbefore described.

The removal of the nut from the clamping jaws 29 and 30 after the sawing of the shell is preferably effected as follows: A rod 100 (Fig. 1) mounted in a frame 98, fixed upon the working table 97, is under the influence of a spring 99. This rod 100 has a laterally projecting pin 101, which is at the height of the nut clamped in between the jaws. As soon as the sawing device proper, mounted upon the working table 10, arrives below the frame 98, which takes place after the sawing of the nutshell and after the clamping jaws have been opened, the laterally projecting pin 101 is pushed by said clamping device so that the spring 99 is put under tension and makes, as soon as the clamping device has moved around, the pin 101 push against the nut which thus is removed from between the clamping jaws.

I claim:—

1. An apparatus for taking the kernel out of nuts and other fruits with hard pericarp, comprising in combination a saw blade for sawing the nut shell, a support in which said saw blade is fixed, a frame of said support, a vertical shaft mounted in said frame, an upper clamping jaw for the nut and a lower clamping jaw for the nut, a toothed wheel gearing between said vertical shaft and said clamping jaws for operating said jaws from said shaft, substantially as described and shown and for the purpose set forth.

2. An apparatus for taking the kernel out of the nuts and other fruits with hard pericarp comprising in combination a saw blade for sawing the nut shell, a support in which said saw blade is fixed, a frame of said support, a vertical shaft mounted in said frame, an upper clamping jaw for the nut and a lower clamping jaw for the nut, a toothed wheel gearing between said vertical shaft and said clamping jaws for operating said jaws from said shaft and a device for uncoupling said toothed gear of the clamping jaws from said vertical shaft consisting of a vertical shaft for said toothed wheel gearing, a sleeve fixed to the frame of the support and inclosing the lower end of said shaft of toothed wheel gearing, a sleeve fixed to the frame being open at both ends, a vertical rod in said sleeve a friction roller at the lower end of said rod, a two armed lever connecting the upper end of said rod with said shaft of the toothed gearing for uncoupling said shaft of the toothed gearing from the vertical shaft when the friction roller of the push rod is being lifted substantially as described and shown and for the purpose set forth.

3. An apparatus for taking the kernel out of nuts and other fruits with hard pericarp, comprising in combination a saw blade for sawing the nut shell, a support in which said saw blade is fixed, a frame of said support, a vertical shaft mounted in said frame, an upper clamping jaw for the nut and a lower clamping jaw for the nut, a toothed wheel gearing between said vertical shaft and said clamping jaws for operating said jaws from said shaft, a vertical shaft of said toothed gearing for the upper clamping jaw, a sleeve fixed upon the lower end of said shaft, a female part of a friction coupling in the lower end of said sleeve, a tubular casing fixed to the lower surface of the working table, a lower vertical shaft revolubly mounted in said casing, a male part of the friction coupling fixed at the upper end of said lower vertical shaft adapted to be coupled with said shaft for the toothed wheel gear of the clamping jaws, means for revolving said lower shaft from said main vertical shaft and means for lifting or lowering said lower vertical shaft to couple or uncouple said lower clamping jaw with said main vertical shaft, substantially as described and shown and for the purpose set forth.

4. An apparatus for taking the kernel out of nuts and other fruits with hard pericarp, comprising in combination a saw blade for sawing the nut shell, a support in which said saw blade is fixed, a frame of said support, a vertical shaft mounted in said frame, an upper clamping jaw for the nut and a lower clamping jaw for the nut, a toothed wheel gearing between said vertical shaft and said clamping jaws for operating said jaws from said shaft, a friction roller at the lower end of said vertical shaft adapted to be lifted or lowered from the main driving shaft, a lateral fixed arm of said frame, the vertical shaft of said upper clamping jaw, a lever hinged with one end to said arm and pivotally mounted in the upper end of said vertical shaft and hinged with the other end to said vertical shaft of the upper clamping jaw, substantially as described and shown and for the purpose set forth.

5. An apparatus for taking the kernel out of nuts and other fruits with hard pericarp, comprising in combination a saw blade for sawing the nut shell, a support in which said saw blade is fixed, a frame of said support, a vertical shaft mounted in said frame, an upper clamping jaw for the nut and a lower clamping jaw for the nut, a toothed wheel gearing between said vertical shaft and said clamping jaws for operating said jaws from said shaft, a vertical rod connected with the shaft of the lower clamping jaw, a piston roller at the lower end of said rod, a piston roller at the lower end of said vertical driving shaft, means for connecting the upper end of said vertical driving shaft with the shaft of said upper clamping jaw, a segment shaped supporting plate for the lower end of said vertical driving shaft and of said vertical rod, cams upon said supporting plate for lifting and lowering the piston rollers and with the same the said rod and driving shaft so that the lower and upper clamping jaws are lowered and lifted respectively, substantially as described and shown and for the purpose set forth.

6. An apparatus for taking the kernel out of nuts and other fruits with hard pericarp, comprising in combination a saw blade for sawing the nut shell, a support in which said saw blade is fixed, a frame of said support, a vertical shaft mounted in said frame, an upper clamping jaw for the nut and a lower clamping jaw for the nut, a toothed wheel gearing between said vertical shaft and said clamping jaws for operating said jaws from said shaft, a shaft of the upper clamping jaw for the nuts and a weight mounted at the upper part of said shaft and serving for pressing said upper clamping jaw against the nut, substantially as described and shown and for the purpose set forth.

7. An apparatus for taking the kernel out of nuts and other fruits with hard pericarp comprising in combination a vertical driving shaft mounted in the frame of the machine so that it can be lifted and lowered, an upper clamping jaw, means for lifting and lowering said upper clamping jaw by said vertical driving shaft, a lower clamp jaw, means for lifting or lowering said lower clamping jaw, a toothed gear for revolving said clamping jaws from said vertical driving shaft, spring influenced saw blades acting like levers fixed in the fixed bearing of said lower clamping jaw, and adapted to bear upon the shell of the revolving nut, substantially as described and shown and for the purpose set forth.

8. An apparatus for taking the kernel out of nuts and other fruits with hard pericarp, comprising in combination an upper clamping jaw for the nut, a lower clamping jaw for the nut, a vertical driving shaft, means for revolving said clamping jaws from said shaft, means for uncoupling said clamping jaws from said revolving means, a saw blade for sawing the nut fixed to the bearings of the lower clamping jaw, a system of articulated levers for gripping, holding and releasing the nut, a casing at the side of said clamping jaws, two cam surfaces in said casing, a push rod guided upon the upper of said cam surfaces, the vertical axle of said system of articulated levers fixed upon said push rod so that it moves with the same for opening or closing the ends of said levers, substantially as described and shown and for the purpose set forth.

9. An apparatus for taking the kernel out of nuts and other fruits with hard pericarp, comprising in combination an upper clamping jaw for the nut, a lower clamping jaw for the nut, a vertical driving shaft, means for revolving said clamping jaws from said shaft, means for uncoupling said clamping jaws from said revolving means, a saw blade for sawing the nut fixed to the bearings of the lower clamping jaw, an arm of the saw blade, a vertical push rod hinged to said arm, a system of articulated levers for gripping, holding and releasing the nut, a casing at the side of said clamping jaws, two cam surfaces in said casing, a push rod guided upon the upper of said cam surfaces, the vertical axle of said system of articulated levers fixed upon said push rod so that it moves with the same for opening or closing the ends of said levers, and a vertical push rod guided upon the lower cam surface of said casing and hinged to said arm of the saw blade, substantially as described and shown and for the purpose set forth.

10. An apparatus for taking the kernel out of nuts and other fruits with hard pericarp, comprising in combination an upper clamping jaw for the nut and a lower clamping jaw for the nut, a vertical driving shaft, means for revolving said clamping jaws from said shaft, means for uncoupling said clamping jaws from said revolving means, a saw blade for sawing the nut fixed to the bearings of the lower clamping jaw, a spring-influenced rod guided in the frame of the machine, a lateral spring-influenced arm of said rod designed to strike at a given moment against the nut to throw the same out of the clamping jaw, substantially as described and shown and for the purpose set forth.

In witness whereof I have hereunto set my hand in the presence of two witnesses.

ANTON PAUL.

Witnesses:
B. WM. FRIZZ,
JOHN J. RONTO.